US 6,708,994 B2

(12) United States Patent
Etzold

(10) Patent No.: US 6,708,994 B2
(45) Date of Patent: Mar. 23, 2004

(54) TRANSVERSE STRUT FOR A TWIST-BEAM AXLE OF A MOTOR VEHICLE

(75) Inventor: Dieter Etzold, Oerlingshausen (DE)

(73) Assignee: Benteler Automobiltechnik GmbH, Paderborn (DE)

(*) Notice: Subject to any disclaimer, the term of this patent is extended or adjusted under 35 U.S.C. 154(b) by 0 days.

(21) Appl. No.: 10/308,749

(22) Filed: Dec. 3, 2002

(65) Prior Publication Data

US 2003/0071432 A1 Apr. 17, 2003

Related U.S. Application Data

(63) Continuation of application No. PCT/DE02/01189, filed on Apr. 3, 2002.

(30) Foreign Application Priority Data

Apr. 4, 2001 (DE) .......................................... 101 16 748

(51) Int. Cl.⁷ .............................................. B60G 21/05
(52) U.S. Cl. ..................... 280/124.106; 280/124.166; 301/124.1
(58) Field of Search ............... 280/124.107, 124.106, 280/124.116, 124.128, 124.166; 301/124.1; 29/897.2, 897.35; 267/273, 188

(56) References Cited

U.S. PATENT DOCUMENTS

| 1,931,105 | A | * | 10/1933 | Crawford et al. ........ 301/124.1 |
| 2,218,127 | A | * | 10/1940 | Urschel ................... 301/124.1 |
| 4,750,757 | A | * | 6/1988 | Long ................... 280/124.106 |
| 5,324,073 | A | | 6/1994 | Alatalo et al. |
| 5,507,518 | A | * | 4/1996 | Nakahara et al. ..... 280/124.166 |
| 5,518,265 | A | * | 5/1996 | Buthala et al. ....... 280/124.166 |
| 5,800,024 | A | * | 9/1998 | Steimmel et al. ........... 301/127 |
| 6,543,857 | B1 | * | 4/2003 | Griffiths et al. ............. 301/127 |

FOREIGN PATENT DOCUMENTS

| DE | 195 33 479 A | 3/1997 |
| EP | 1 036 679 A2 | 9/2000 |
| EP | 1 078 785 A | 2/2001 |

* cited by examiner

Primary Examiner—David R. Dunn
(74) Attorney, Agent, or Firm—Henry M. Feiereisen

(57) ABSTRACT

A transverse strut for a twist-beam axle of a motor vehicle is made of an extrusion profile and includes an outer tube and a bulbed land area extending inwardly from an inner wall surface of the outer tube and defined by a radial extension, which is smaller than an inner radius of the outer tube. The outer tube has a circumferential length and defines a central length portion, which is positioned in confronting relationship to the bulbed land area and recessed to form a gap over a portion of the circumferential length.

12 Claims, 2 Drawing Sheets

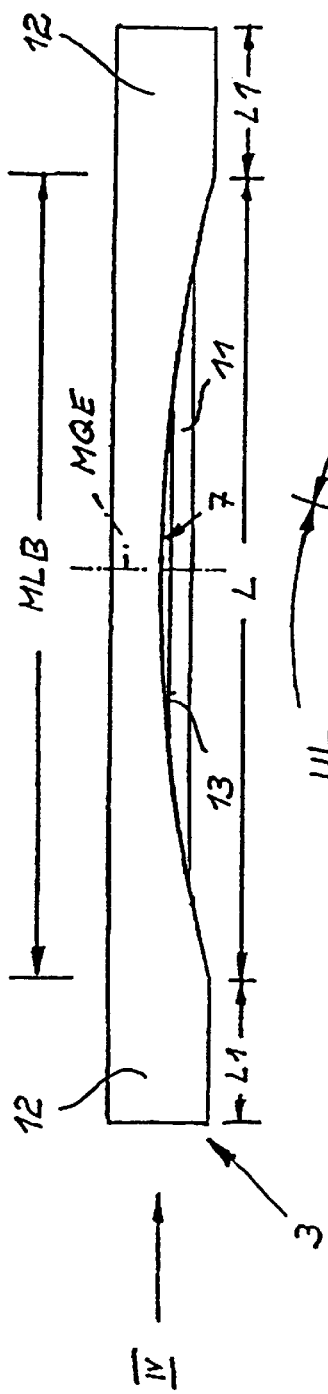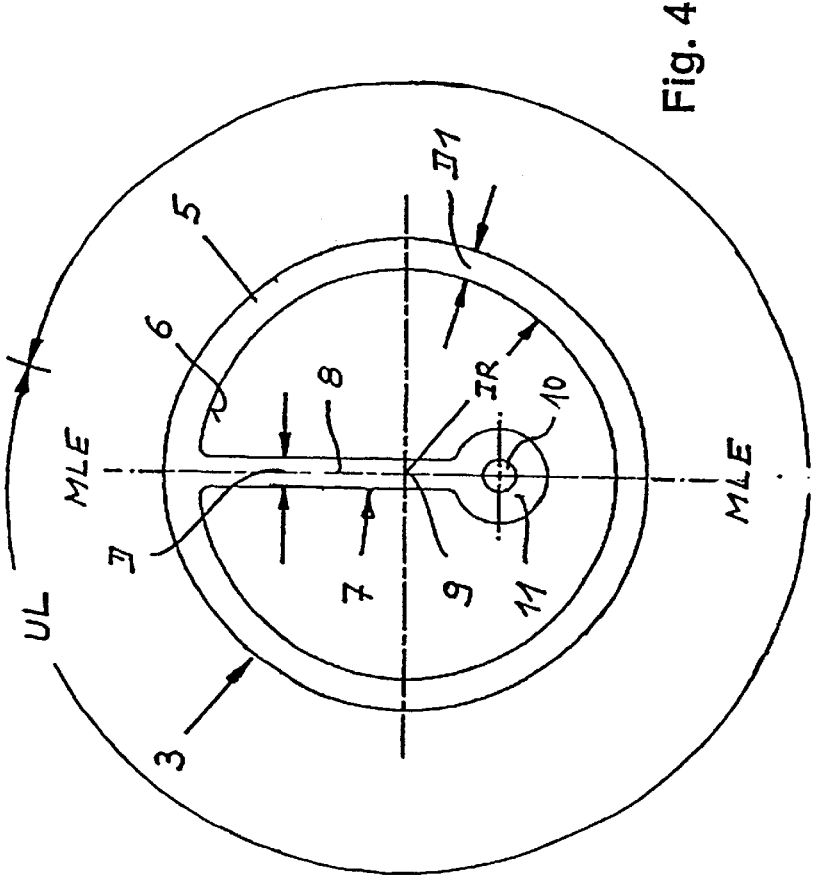

TRANSVERSE STRUT FOR A TWIST-BEAM AXLE OF A MOTOR VEHICLE

CROSS-REFERENCES TO RELATED APPLICATIONS

This application is a continuation of prior filed copending PCT International application no. PCT/DE02/01189, filed Apr. 3, 2002, which designated the United States and on which priority is claimed under 35 U.S.C. §120, the disclosure of which is hereby incorporated by reference.

This application claims the priority of German Patent Application, Ser. No. 101 16 748.2, filed Apr. 4, 2001, pursuant to 35 U.S.C. 119(a)–(d), the disclosure of which is incorporated herein by reference.

BACKGROUND OF THE INVENTION

The present invention relates, in general, to a transverse strut for a twist-beam axle of a motor vehicle.

It is generally known to use a torsion bar in addition to the transverse strut for a twist-beam axle for alignment of the track stiffness, camber stiffness and roll stiffness. Hereby, the functions, track stiffness, camber stiffness and roll stiffness, are substantially assumed by these separate components so that the afore-mentioned functions can be individually trimmed independently from one another. The use of a separate torsion bar is, however, disadvantageous and complicates the overall structure.

It would therefore be desirable and advantageous to provide an improved transverse strut for a twist-beam axle of a motor vehicle, which obviates prior art shortcomings and which is able to integrate in it the functions, track stiffness, camber stiffness and roll stiffness.

SUMMARY OF THE INVENTION

According to one aspect of the present invention, a transverse strut for a twist-beam axle of a motor vehicle is made of an extrusion profile and includes an outer tube and a bulbed land area extending inwardly from an inner wall surface of the outer tube and defined by a radial extension which is smaller than an inner radius of the outer tube, wherein the outer tube has a circumferential length and defines a central length portion which is positioned in confronting relationship to the bulbed land area and recessed to form a gap over a portion of the circumferential length.

The present invention resolves prior art problems by configuring the transverse strut through a combination of an outer tube as bending profile with an inner longitudinal bulbed land area which represents a torsion bar, so as to allow a trimming of the functions, track stiffness, camber stiffness and roll stiffness, independently from one another, without resorting to the use of separate components, as provided in the prior art. The bending strength of the transverse strut is hereby enhanced by the own inertia of the bulbed land area. In addition, as the bulbed land area is distanced from the common gravity center of the profile with the outer tube, the bending strength is positively influenced (Steiner's theorem). Thus, the camber stiffness can be increased without the need for additional material. Also, the outer tube can be designed with better material use because the gravity of the transverse strut is shifted, as a result of the mass of the bulbed land area—relating to the own gravity center—in the direction of the bulbed land area. Material use is thus optimal at slight weight. Furthermore, the bulbed land area can be configured in an optimum manner to address tension concerns depending on the application at hand. It is also possible to change axial relationships to best suit various requirements as far as roll stiffness is concerned, by simply modifying the configuration and dimensions of the bulbed land area. Finally, the provision of a gap in longitudinal central length portion of the outer tube is able to impart the transverse strut with a reduced torsional stiffness.

According to another feature of the present invention, the outer tube defines a central cross plane and has opposite ends which are circumferentially closed, wherein the gap may extend approximately over half the circumferential length and has a circumferential length which gradually decreases to zero in the direction of the closed ends of the outer tube. In this way, the torsional stiffness can be further varied.

According to another feature of the present invention, the gap may have an axial length which is dimensioned in relation to an axial length of the closed ends at a ratio of about 4:1 to 6:1, preferably at a ratio of 5:1. Sizing the axial length of the closed ends of the outer tube depends on the requirements at hand, in particular on the type of connection between the transverse strut and longitudinal control arms of the twist-beam axle.

According to another feature of the present invention, the bulbed land area may have a tubular configuration. In this way, the roll stiffness can easily be modified. The bulbed land area may be formed interiorly with a closed longitudinal channel of a size, which can be dimensioned to best suit the application at hand.

According to another feature of the present invention, the bulbed land area has a radial wall extending inwardly from the inner wall surface of the outer tube to thereby distance the bulbed land area from the inner wall surface of the outer tube. In this way, the radial wall assumes the function of a thrust strut. Suitably, the radial wall extends in a longitudinal center plane of the outer tube and may have a radial height, which is greater than the inner radius of the outer tube.

According to another feature of the present invention, the radial height of the radial wall plus the radial extension of the bulbed land area can be dimensioned together in relation to an inner diameter of the outer tube at a ratio of about 0.8:1.4, preferably, about 1:1.2.

According to another feature of the present invention, the radial wall may have a thickness, which is approximately the same as a wall thickness of the outer tube. In this way, the thickness of the radial wall and the wall thickness of the outer tube can be suited to one another in an optimum manner so as to symmetrically distribute the edge fiber distance for the outer tube. Material consumption is reduced and weight is decreased. Suitably, the radial extension of the bulbed land area may be dimensioned at about three times the thickness of the radial wall.

Currently preferred is the production of the transverse strut from aluminum or aluminum alloy, although any material suitable for use in an extrusion process may be appropriate.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a side view of the transverse strut of FIG. 2; and

FIG. 4 is an end view, on an enlarged scale, of the transverse strut in the direction of arrow IV in FIG. 3.

DETAILED DESCRIPTION OF PREFERRED EMBODIMENTS

Figure 1:
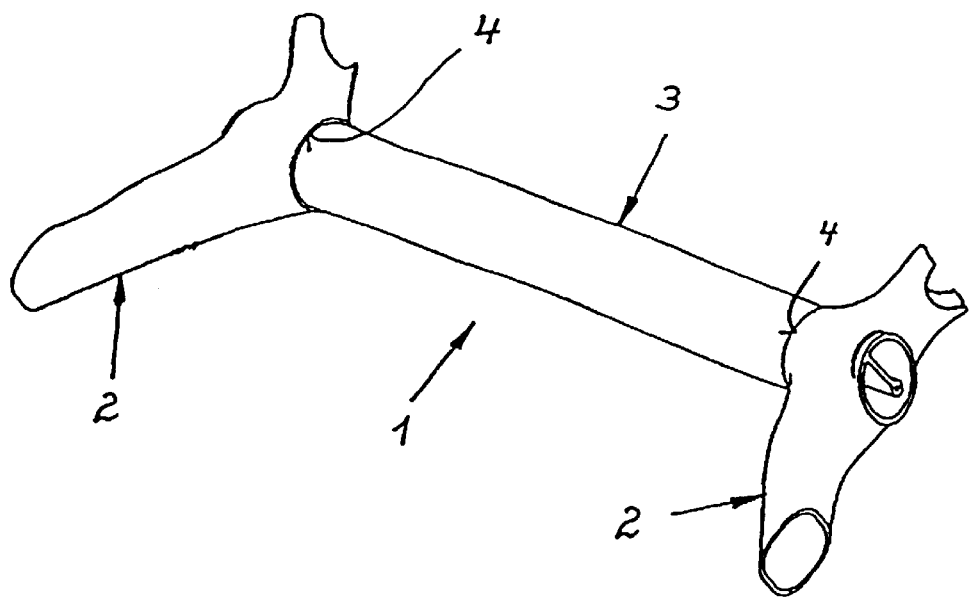
FIG. 1 is a perspective illustration of a twist-beam axle for a motor vehicle, embodying the subject matter of the present invention.

Throughout all the Figures, same or corresponding elements are generally indicated by same reference numerals. These depicted embodiments are to be understood as illustrative of the invention and not as limiting in any way.

Turning now to the drawing, and in particular to FIG. 1, there is shown a perspective illustration of a twist-beam axle, generally designated by reference numeral 1 for a motor vehicle and embodying the subject matter of the present invention. The twist-beam axle 1 typically includes two longitudinal control arms 2 and a transverse strut 3, which is designed of generally cylindrical configuration. The transverse strut 3 interconnects the longitudinal control arms 2 by engaging respective pockets 4 in the longitudinal control arms 2, which pockets 4 conform to an outer contour of the transverse strut 3.

Figure 2:
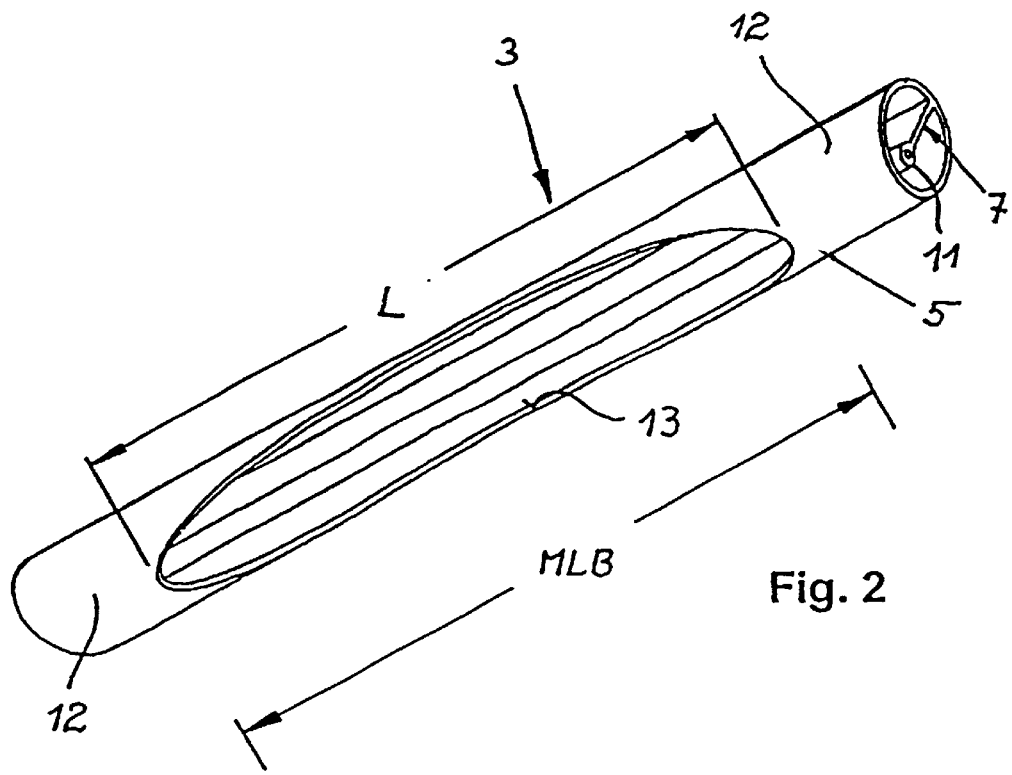
FIG. 2 is a perspective illustration, on an enlarged scale, of a transverse strut according to the present invention.

As shown in FIG. 2, which is an enlarged perspective illustration of the transverse strut according to the present invention, and in particular in FIG. 4, the transverse strut 3 is made through extrusion of aluminum or aluminum alloy and includes an outer tube 5 as bending profile and a wall 7, which extends radially inwards from the inner wall surface 6 of the outer tube 5 and terminates in a longitudinal bulbed land area 11. The radial wall 7 assumes the function of a thrust strut, whereas the bulbed land area 11 assumes the function of a torsion bar. The radial wall 7 defines a longitudinal center plane 8, intersecting the longitudinal axis 9 and thus also the longitudinal center plane MLE of the outer tube 5, and has a thickness D which approximately corresponds to a wall thickness D1 of the outer tube 5.

The bulbed land area 11 has a tubular configuration and is formed interiorly with a longitudinal channel 10 so that the bulbed land area 11 has a cross section substantially in the shape of a donut, as shown in FIG. 4. The bulbed land area 11 has a radial extension RE which is dimensioned approximately three times the thickness D of the radial wall 7.

The radial wall 7 has a radial height H which is greater than an inner radius IR of the outer tube 5, but smaller than an inner diameter ID of the outer tube 5. The ratio of radial height H of the wall 7 plus the radial extension RE of the bulbed land area 11 to the inner diameter ID of the outer tube 5 is about 0.8:1.4, preferably about 1:1.2.

As shown in particular in FIG. 3, the outer tube 5 has a recessed central length portion zone MLB in confronting relationship to the bulbed land area 11 to form a gap 13 extending over a portion of the circumferential length UL of the outer tube 5. In the area of its longitudinal cross plane ME, the outer tube 5 is recessed by about half the circumferential length UL. The outer tube 5 has opposite axial ends 12 which are closed in circumferential direction, whereby the circumferential length of the gap 13 decreases towards zero in the direction of the closed ends 12 of the outer tube 5. The gap 13 has an axial length L which is dimensioned in relation to a length L1 of the closed ends 12 of the outer tube 5 at a ratio of about 4:1 to 6:1, preferably 5:1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A transverse strut for a twist-beam axle of a motor vehicle, made of an extrusion profile and comprising an outer tube and a wall extending in a longitudinal center plane of the outer tube inwardly from an inner wall surface of the outer tube and terminating in a bulbed land area, said bulbed land area defined by a radial extension which is smaller than an inner radius of the outer tube so as to extend at a distance to the inner wall surface of the outer tube, wherein the outer tube has a circumferential length and defines a central length portion which is positioned in confronting relationship to the bulbed land area and recessed to form a gap over a portion of the circumferential length.

2. The transverse strut of claim 1, wherein the outer tube defines a central cross plane and has opposite ends which are circumferentially closed, said gap extending approximately over half the circumferential length of the outer tube and has a circumferential length which gradually decreases to zero in the direction of the closed ends of the outer tube.

3. The transverse strut of claim 2, wherein the gap has an axial length which is dimensioned in relation to an axial length of the closed ends at a ratio of about 4:1 to 6:1.

4. The transverse strut of claim 2, wherein the ratio is 5:1.

5. The transverse strut of claim 1, wherein the bulbed land area has a tubular configuration.

6. The transverse strut of claim 1, wherein the radial wall has a radial height which is greater than the inner radius of the outer tube.

7. The transverse strut of claim 6, wherein the radial height of the radial wall plus the radial extension of the bulbed land area are dimensioned in relation to an inner diameter of the outer tube at a ratio of about 0.8:1.4.

8. The transverse strut of claim 7, wherein the ratio is about 1:1.2.

9. The transverse strut of claim 1, wherein the radial wall has a thickness which is approximately the same as a wall thickness of the outer tube.

10. The transverse strut of claim 9, wherein the radial extension of the bulbed land area is dimensioned at about three times the thickness of the radial wall.

11. The transverse strut of claim 1, wherein the extrusion profile is made of a material selected from the group consisting of aluminum and aluminum alloy.

12. The transverse strut of claim 1, wherein the bulbed land area is formed interiorly with a longitudinal channel.

* * * * *

UNITED STATES PATENT AND TRADEMARK OFFICE
CERTIFICATE OF CORRECTION

PATENT NO.    : 6,708,994 B2
DATED         : March 23, 2004
INVENTOR(S)   : Dieter Etzold It is certified that error appears in the above-identified patent and that said Letters Patent is hereby corrected as shown below:

<u>Column 3,</u>
Line 57, change "ME" to -- MQE --

Signed and Sealed this

First Day of June, 2004

JON W. DUDAS
*Acting Director of the United States Patent and Trademark Office*